US011878341B2

(12) United States Patent
Duan et al.

(10) Patent No.: US 11,878,341 B2
(45) Date of Patent: Jan. 23, 2024

(54) METHOD FOR PREPARING ALUMINUM CARBON COMPOSITE BY USING FOAM ALUMINUM

(71) Applicants: Wuhan Research Institute of Materials Protection, Wuhan (CN); Material Laboratory of State Grid Corporation of China (Shandong)

(72) Inventors: Haitao Duan, Wuhan (CN); Yinhua Li, Wuhan (CN); Jiesong Tu, Wuhan (CN); Xiaoming Wang, Wuhan (CN); Lijun Zong, Wuhan (CN); Dan Jia, Wuhan (CN); Shengpeng Zhan, Wuhan (CN); Tian Yang, Wuhan (CN)

(73) Assignees: Wuhan Research Institute of Materials Protection, Wuhan (CN); Material Laboratory of State Grid Corporation of China (Shandong), Jinan (CN)

( * ) Notice: Subject to any disclaimer, the term of this patent is extended or adjusted under 35 U.S.C. 154(b) by 0 days.

(21) Appl. No.: 18/313,325

(22) Filed: May 6, 2023

(65) Prior Publication Data
US 2023/0381856 A1    Nov. 30, 2023

(30) Foreign Application Priority Data

May 25, 2022    (CN) .......................... 2022105776437

(51) Int. Cl.
| B22D 17/00 | (2006.01) |
| B22D 21/00 | (2006.01) |
| C22C 1/10  | (2023.01) |
| C22C 21/00 | (2006.01) |

(52) U.S. Cl.
CPC ........... *B22D 17/00* (2013.01); *B22D 21/007* (2013.01); *C22C 1/1005* (2013.01); *C22C 1/1026* (2013.01); *C22C 21/00* (2013.01)

(58) Field of Classification Search
CPC ...... B22D 17/00; B22D 21/00; B22D 21/007; C22C 1/1026; C22B 21/00; C22B 21/06
USPC .................................... 164/47, 113; 75/415
See application file for complete search history.

(56) References Cited

U.S. PATENT DOCUMENTS

| 3,902,861 | A  | * | 9/1975  | Gillot et al. ......... | C04B 35/524 |
|           |    |   |         |                         | 428/539.5   |
| 4,957,779 | A  | * | 9/1990  | Irick, Jr. et al. ..... | C04B 35/652 |
|           |    |   |         |                         | 427/397.8   |
| 2003/0224220 | A1 | * | 12/2003 | Nguyen et al. ....... | C04B 41/507 |
|           |    |   |         |                         | 428/702     |
| 2004/0253136 | A1 | * | 12/2004 | Shamblen et al. ..... | C22C 1/04   |
|           |    |   |         |                         | 419/34      |
| 2013/0154168 | A1 | * | 6/2013  | Perryman ............... | C21B 3/08   |
|           |    |   |         |                         | 266/233     |

FOREIGN PATENT DOCUMENTS

| CN | 104846230 A | 8/2015 |
| CN | 108060321 A | 5/2018 |

OTHER PUBLICATIONS

CNIPA, Notification of a First Office Action for CN202210577643.7, dated Dec. 8, 2022.
Wuhan Material Protection Research Institute Co., Ltd., State Grid Shandong Electric Power Company Electric Power Science Research Institute (Applicants), Reply to Notification of a First Office Action for CN202210577643.7, w/ replacement claims, Dec. 30, 2022.
Wuhan Material Protection Research Institute Co., Ltd., State Grid Shandong Electric Power Company Electric Power Science Research Institute (Applicants), Supplemental Reply to Notification of a First Office Action for CN202210577643.7, w/ (allowed) replacement claims, Mar. 9, 2023.
CNIPA, Notification to grant patent right for invention in CN202210577643.7, dated Mar. 15, 2023.

* cited by examiner

*Primary Examiner* — Kevin P Kerns
(74) *Attorney, Agent, or Firm* — Zhigang Ma

(57) ABSTRACT

A method for preparing an aluminum carbon composite by using a foam aluminum includes the following steps. Electromagnetic stirring and drying are performed on the foam aluminum and a carbon material to obtain a foam aluminum preform; an aluminum block is melted into aluminum liquid, the aluminum liquid is adjusted to qualified aluminum liquid, the qualified aluminum liquid is cooled to a temperature of 620~650° C. and keeping the temperature to make the qualified liquid aluminum become a semi-solid state, then the foam aluminum preform is pressed into the qualified liquid aluminum and performing electromagnetic stirring. A mold is heated to a certain temperature and extrusion molding is performed to obtain a carbon reinforced aluminum matrix composite material. The method overcomes a problem that the carbon material and the aluminum matrix have poor wettability and are not easy to be added into the aluminum matrix.

6 Claims, No Drawings

METHOD FOR PREPARING ALUMINUM CARBON COMPOSITE BY USING FOAM ALUMINUM

FIELD OF THE DISCLOSURE

The disclosure relates to a technical field of aluminum alloy smelting in a metallurgical industry, and relates to a preparation method for obtaining an aluminum carbon composite by effectively adding a carbon material to a pure aluminum matrix, in particular to a method for preparing the aluminum carbon composite by using foam aluminum, focusing on solving a problem that the carbon material is not easy to be evenly added to the aluminum matrix by a melt casting method.

BACKGROUND OF THE DISCLOSURE

The development of aluminum material performance control technology is a process of continuously meeting requirements of strength, formability, and conductivity. At past, high strength and good formability were mostly achieved through alloying. However, the alloying brings some problems, such as high production costs and severe decreases in the conductivity, which limits the aluminum in certain areas.

A main characteristic of pure aluminum is low density (2.7 grams per cubic centimeter ($g/cm^3$)), which is only one-third of density of iron. Meanwhile, the electric conductivity and thermal conductivity of the pure aluminum are good, second only to silver, copper, and gold. Due to a fact that the pure aluminum easily forms an aluminum oxide ($Al_2O_3$) dense oxide film with oxygen in air, it can effectively prevent an inner layer of metal oxygen, therefore, it has good corrosion resistance in atmosphere. Mechanical properties of the pure aluminum are characterized by low strength and good plasticity, which can be processed through cold and hot deformation. Based on above characteristics, industrial pure aluminum is mainly used for manufacturing wires and cables, as well as parts and household appliances that require thermal conductivity and atmospheric corrosion resistance but do not have high strength requirements. With development of economy and social progress, the technical expectations for the aluminum matrix are increasing. For example, in the rapidly developing fields of power and aerospace, the aluminum matrix, as lightweight conductor materials, hope to improve the strength of the aluminum matrix while maintaining a high level of electric conductivity.

The carbon material (e.g., graphene, a carbon nanotube, a carbon fiber, etc.) has become a research hotspot in recent years. The carbon materials with different morphologies and structures have unique mechanical, electrical, chemical, and optical properties, the carbon materials have received great attention from a material industry. However, due to lipophilicity of the carbon materials and hydrophilicity of the aluminum materials, wettability of the carbon materials and the aluminum matrix are poor, the bonding force is weak, and it is difficult to evenly disperse. How to use a melt casting method suitable for industrial production and standardized operation to evenly disperse the carbon material into the aluminum matrix, while maintaining high conductivity of the aluminum matrix and effectively improving the strength of the aluminum matrix, is an urgent technical problem to be solved.

A search of literature reveals that powder metallurgy technology is currently the most widely studied method for uniformly dispersing the carbon material into the aluminum matrix. Powder metallurgy can achieve the uniformity of the carbon material and the aluminum matrix composition and the yield of the carbon material. The process is mature, with low energy consumption, the process can achieve near net forming, therefore, it is the most commonly used forming method in applied basic research. However, internal pores of compacts made from powder pressing cannot be completely eliminated, and interfacial adhesion is weak, therefore, the powder metallurgy products have a significant difference in strength and toughness compared to castings with corresponding components.

Because of its porous structure, foam aluminum is widely used in transportation industry, aerospace industry and building structure industry due to its lightweight, high specific stiffness, high damping and shock absorption performance, good acoustic, thermal performance, heat resistance, easy processing and other excellent characteristics. However, there are few reports on the preparation of the aluminum carbon composite by using the foam aluminum and the carbon material.

After searching, the Chinese patent publication No. CN104846230A discloses a foam iron reinforced aluminum matrix composite with high temperature wear resistance and its preparation method. Its implementation method is to first prepare reinforced aluminum alloy with micron sized silicon carbide (SiC) particles as reinforcement materials, then place the reinforced aluminum alloy on the top of the foam iron, and under a certain pressure, temperature and time, make the reinforced aluminum alloy flow into the pores of the foam iron by melting and flowing automatically, the aluminum matrix composite reinforced by the foam iron is obtained. A main purpose of this patent document is to improve the high-temperature wear resistance of the material. The introduction of a large amount of silicon (Si) and iron (Fe) elements into the material inevitably affects its formability and conductivity, and the adopted preparation method is more suitable for laboratory preparation. The Chinese patent publication No. CN113122757A discloses a preparation method of an aluminum matrix graphene composite, which is realized by soaking a foam aluminum in graphene dispersion for a certain time, drying the soaked foam aluminum, heating it at 250~600° C. for a certain time, and then hot rolling to prepare the aluminum matrix graphene composite. This preparation method does not limit porosity and a pore size of the foam aluminum material. The porosity and the pore size have a decisive impact on an amount and agglomeration of the graphene adsorbed by the foam aluminum. A higher number of adsorptions is prone to poor bonding during later preparation of the aluminum matrix graphene composite, resulting in poor aluminum matrix graphene composite properties. Moreover, a focus of the aluminum matrix graphene composite prepared is the thermal conductivity of the aluminum matrix graphene composite, and the strength and conductivity of the aluminum matrix graphene composite are not mentioned.

SUMMARY OF THE DISCLOSURE

A purpose of the disclosure is to provide a prefabricated foam aluminum carbon material preform using porous foam aluminum, and successfully apply the preform to aluminum alloy smelting to prepare the aluminum carbon composite, focusing on solving a problem that a carbon material is not easy to be evenly added to an aluminum matrix by a melt casting method.

In order to solve the above technical problem, the technical means adopted by the disclosure are as following.

A method for preparing an aluminum carbon composite by using foam aluminum includes the following steps:
step 1, preparing raw materials: pickling a carbon material in dilute acid; ultrasonic cleaning the foam aluminum in anhydrous ethanol; drying an aluminum block, a slag remover, and a refining agent used for smelting;
step 2, performing electromagnetic stirring on a target proportion of the foam aluminum and the carbon material in the anhydrous ethanol to obtain a foam aluminum preform adsorbed with the carbon material;
step 3, drying the stirred foam aluminum;
step 4, melting the aluminum block into initial aluminum liquid in a crucible furnace and introducing inert gas for protection;
step 5, adding the slag remover and the refining agent into the initial aluminum liquid successively for smelting to obtain aluminum liquid;
step 6, reducing temperature of the aluminum liquid and keeping the temperature for a target time to make the aluminum liquid become a semi-solid state;
step 7, adding the foam aluminum preform, pressing the foam aluminum preform into the aluminum liquid with a bell jar, and at the same time stirring to obtain foam aluminum carbon aluminum liquid;
step 8, heating a forming device to a preset temperature; and
step 9, pouring the foam aluminum carbon aluminum liquid obtained in step 7 into the forming device for extrusion molding, thereby obtaining the aluminum carbon composite prepared by using the foam aluminum.

In an embodiment, in step 1, a mass fraction of aluminum in each of the aluminum block and the foam aluminum is no less than 99.6%.

In an embodiment, the foam aluminum includes foam aluminum with micro through-holes and through-holes, a porosity ratio of the foam aluminum is no less than 85%, a pore diameter of the foam aluminum is no greater than 1 micrometer ($\mu$m), the foam aluminum is processed into fragments, with volume no greater than 1 cubic millimeter ($mm^3$).

In an embodiment, the carbon material is one of graphite and graphene, the carbon material is a nanoscale carbon material.

In an embodiment, the dilute acid includes but is not limited to hydrochloric acid and nitric acid; and
the slag remover is a chloride salt, and the refining agent is a sodium salt.

In an embodiment, in step 2, a mass ratio of the foam aluminum to the carbon material is 1:3 to 1:5, and the stirring is performed in alternating clockwise and counterclockwise cycles, and a stirring time is in a range of 3 h to 6 h.

In an embodiment, in step 3, a drying temperature of the foam aluminum preform is in a range of 200° C. to 300° C., and a drying time is in a range of 2 h to 3 h.

In an embodiment, in step 4, a heating temperature of the crucible furnace is in a range of 700° C. to 800° C.; and the inert gas is one of argon and helium.

In an embodiment, in step 5, the slag remover is added into the initial aluminum liquid and stirring for 5-10 minutes (min), and then the refining agent is added into the initial aluminum liquid and stirring for 5~10 min.

In an embodiment, in step 6, the reduced temperature is in a range of 620° C. to 650° C.

In an embodiment, in step 8, a temperature of the forming device is in a range of 200° C. to 300° C.

In an embodiment, in step 9, a pressure of the extrusion molding is in a range of 100 megapascals (MPa) to 150 MPa.

The disclosure further provides an aluminum carbon composite prepared by using the porous structure of the foam aluminum, which is prepared by the preparation method described in any one of the above items. C % (wt %) of the aluminum carbon composite is 1.0~3.0%, while the rest is aluminum and inevitable impurities. A tensile strength of the aluminum carbon composite prepared through the above process reaches 140 MPa, and the conductivity reaches 58% international annealed copper standard (IACS).

Functions and control principles of each component and main process in the disclosure:
by using the porous structure of the foam aluminum, the carbon material is evenly distributed in the aluminum matrix and plays a role of dispersion strengthening. At the same time, dispersed particles can be used as nucleation points to refine a grain, which can strengthen the tensile strength of the aluminum matrix without reducing its conductivity.

In the disclosure, controlling the following processes.
A reason for selecting the foam aluminum is that the foam aluminum has a large number of composite porous structures of closed cells, through holes and micro-through holes. The porous structure has the structural characteristics of "adsorption", "separation" and "uniformity". Using the adsorption effect of the porous structural material and a strong dispersion effect of the electromagnetic stirring, the graphene is evenly adsorbed into the pores of the foam aluminum to form a foam aluminum graphene composite with a certain binding force. At the same time, the foam aluminum is made of the pure aluminum and will not introduce other elements.

A reason for choosing one of the graphite and the graphene is that each carbon atom of the graphite is surrounded by three other carbon atoms, arranged in honeycomb like multiple hexagons. Due to the fact that each carbon atom emits an electron, which can move freely, the conductivity of the graphite is 100 times higher than that of ordinary non-metallic minerals. The graphene has excellent mechanical properties (Young's modulus up to 1 terabyte pascals (TPa), breaking strength about 130 gigapascals (GPa)), thermal properties (thermal conductivity about 5000 watt/meter-kelvin (W/m·K)) and electrical properties (electron mobility up to 15000 square centimeter/volt·second ($cm^2$/V·S), conductivity about 108 siemens/meter (S/m)).

A reason why foam aluminum and carbon material are fully stirred in anhydrous ethanol in a clockwise and counterclockwise cycle is to ensure that the carbon material is fully absorbed into the pores and do not fall, so as to obtain a preform with strong adhesion.

A reason why an original size of the aluminum foam is limited (an equivalent size of the aluminum foam is less than or equal to 1 mm, that is, a volume is less than or equal to 1 $mm^3$) is to prepare for the subsequent smelting. Smaller original size can increase the specific surface area and increase the adsorption quantity of the carbon material. At the same time, smaller size is more likely to be driven by the stirred aluminum liquid, and it is evenly distributed in the aluminum liquid, contributing to the strength of the material.

A reason why aluminum liquid is cooled to 620~650° C. is to properly reduce fluidity of the aluminum liquid and prevent the foam aluminum from floating up after being pressed in. At the same time, it has a certain temperature and the fluidity, which can fully melt the foam aluminum and the aluminum liquid, and the carbon material can be evenly dispersed into the aluminum liquid by stirring the foam aluminum and aluminum liquid.

A reason for controlling the heating temperature of the molding equipment to be in a range of 200° C. to 300° C. is to slow down solidification and temperature drop of the liquid poured into the mold, prevent the grain growth, and provide guarantee for subsequent extrusion molding.

Compared with the related art, the beneficial effects of the disclosure are as following:

the disclosure makes use of the special structural characteristics of the foam aluminum, coupled with the strong dispersion effect brought by electromagnetic stirring, to prepare foam aluminum carbon material preform, which provides a prerequisite for the full and uniform addition of the carbon material to the aluminum matrix, and then uses the characteristics of semi-solid flow weakening to add and stir the preform, effectively improving the problem of poor wettability of the carbon material and the aluminum liquid, which makes it difficult to add. By utilizing high carrier mobility and bipolar electric field effect of the carbon material, the effect of insulation channels is reduced to improve conductivity. By utilizing the dispersion strengthening effect of the carbon material in the aluminum matrix, the strength of the material is improved. The tensile strength of the aluminum carbon composite obtained by the disclosure reaches 140 MPa, and the conductivity reaches 58% IACS. The conductivity is similar to that of pure aluminum, and the strength is significantly improved compared to the pure aluminum, resulting in better performance products.

DETAILED DESCRIPTION OF EMBODIMENTS

The disclosure is described in detail below.

Table 1 shows a list of values for embodiments 1~5 of the disclosure and comparative examples 1 and 2.

Table 2 shows a list of performance tests for the embodiments 1~5 of the disclosure and the comparative examples 1 and 2.

Each embodiment of the disclosure is prepared according to the following steps 1 to 8.

Step 1, graphene is pickled in 25% hydrochloric acid for 5 minutes (min), and foam aluminum is ultrasonically cleaned in anhydrous ethanol for 20 min; and the aluminum block, slag remover, and refining agent are dried in a 200° C. oven for 2 hours (h) to remove moisture.

Step 2, the electromagnetic stirring is performed on the foam aluminum and the graphene at a ratio of foam aluminum:graphene of 1:3 in anhydrous ethanol for 4 h, then drying to obtain a foam aluminum preform adsorbed with a carbon material.

Step 3, the aluminum block is heated at 750~800° C. until it melts, and argon gas is introduced for protection.

Step 4, the slag remover is added and stirred for 5 min, then the modifier is added and stirred for 5 min.

Step 5, the temperature of the aluminum liquid is reduced to 630° C. and the temperature is kept for 10 min to make the aluminum liquid become a semi-solid state.

Step 6, the dried foam aluminum perform is added, the foam aluminum preform is pressed into the aluminum liquid with a bell jar, and at the same time electromagnetically stirring is performed for 10 min to obtain foam aluminum carbon aluminum liquid.

Step 7, a rectangular forming device is heated to 250° C.

Step 8, the foam aluminum carbon aluminum liquid obtained in step 6 is poured into the rectangular forming device for extrusion molding by using a press with an extrusion pressure of 100 MPa, thus a rectangular test block is obtained. The rectangular test block is cooled to a room temperature, and a high-strength, high conductivity, and wear-resistant aluminum carbon composite is obtained.

Five embodiments for preparing the aluminum carbon composites using aluminum foam with high electrical conductivity of the disclosure and comparative examples are provided by selecting different material components and processes. Each composition ratio is shown in Table 1.

Table 1 shows chemical composition and process of the embodiments and the comparative examples of the disclosure:

| Embodiment | Carbon category | Foam aluminum pore diameter/ μm | Foam aluminum: Graphene (Mass ratio) | (Step 2) Stirring time/h | Aluminum liquid temperature when aluminum foam is added/° C. |
|---|---|---|---|---|---|
| 1 | graphene | 1.0 | 1:3 | 3 | 650 |
| 2 | graphene | 0.8 | 1:4 | 4 | 640 |
| 3 | graphene | 0.5 | 1:5 | 5 | 630 |
| 4 | graphite | 0.5 | 1:3 | 6 | 620 |
| 5 | graphite | 1.0 | 1:5 | 3.5 | 620 |
| Comparative example 1 | graphite | 10 | 1:3 | 5 | 620 |
| Comparative example 2 | graphene | 0.5 | 1:3 | 0.5 | 750 |

Table 2 shows performance results of the embodiments and the comparative examples of the disclosure:

| Embodiment | Tensile strength/ MPa | Conductivity/ % IACS |
|---|---|---|
| 1 | 140 | 59 |
| 2 | 142 | 59 |
| 3 | 151 | 58 |
| 4 | 148 | 58 |
| 5 | 143 | 58 |
| Comparative example 1 | 95 | 60 |
| Comparative example 2 | 89 | 61 |

From Table 2, it can be seen that the aluminum carbon composite prepared by each of the five embodiments of the disclosure maintains a high level of electric conductivity while significantly improving its strength.

The above embodiments are only intended to illustrate the disclosure and not to limit it. Although the disclosure has been described in detail with reference to the embodiments, those skilled in the art should understand that various combinations, modifications, or equivalent substitutions of technical solutions of the disclosure do not deviate from spirit and scope of the technical solutions of the disclosure, and should be covered within the scope of claims of the disclosure.

What is claimed is:

1. A method for preparing an aluminum carbon composite by using foam aluminum, wherein the method comprises the following steps:

step 1, preparing raw materials: pickling a carbon material in dilute acid; ultrasonic cleaning the foam aluminum in anhydrous ethanol; drying an aluminum block, a slag remover, and a refining agent used for smelting;

step 2, performing electromagnetic stirring on a target proportion of the foam aluminum and the carbon material in the anhydrous ethanol;

step 3, drying the stirred foam aluminum to obtain a foam aluminum preform adsorbed with the carbon material;

step 4, melting the aluminum block into initial aluminum liquid in a crucible furnace and introducing inert gas for protection;

step 5, adding the slag remover and the refining agent into the initial aluminum liquid successively for smelting to obtain aluminum liquid;

step 6, reducing temperature of the aluminum liquid to a range of 620° C. to 650° C. and keeping the temperature for a target time to make the aluminum liquid become a semi-solid state;

step 7, adding the foam aluminum preform, pressing the foam aluminum preform into the aluminum liquid, and at the same time stirring to obtain foam aluminum carbon aluminum liquid;

step 8, heating a forming device to a preset temperature; and step 9, pouring the foam aluminum carbon aluminum liquid obtained in step 7 into the forming device for extrusion molding, thereby obtaining the aluminum carbon composite prepared by using the foam aluminum;

wherein in step 1, a mass fraction of aluminum in each of the aluminum block and the foam aluminum is no less than 99.6%;

the foam aluminum comprises foam aluminum with through-holes, a porosity ratio of the foam aluminum is no less than 85%, a pore diameter of the foam aluminum is no greater than 1 micrometer (µm), the foam aluminum is processed into fragments, with volume no greater than 1 cubic millimeter ($mm^3$);

the carbon material is one of graphite and graphene, the carbon material is a nanoscale carbon material;

the dilute acid is one of hydrochloric acid and nitric acid; and the slag remover is a chloride salt, and the refining agent is a sodium salt;

wherein in step 2, a mass ratio of the foam aluminum to the carbon material is 1:3 to 1:5, and the stirring is performed in alternating clockwise and counterclockwise cycles, and a stirring time is in a range of 3 h to 6 h.

2. The method for preparing the aluminum carbon composite by using the foam aluminum according to claim 1, wherein in step 3, a drying temperature of the foam aluminum preform is in a range of 200° C. to 300° C., and a drying time is in a range of 2 h to 3 h.

3. The method for preparing the aluminum carbon composite by using the foam aluminum according to claim 1, wherein in step 4, a heating temperature of the crucible furnace is in a range of 700° C. to 800° C.; and the inert gas is one of argon and helium.

4. The method for preparing the aluminum carbon composite by using the foam aluminum according to claim 1, wherein in step 5, the slag remover is added into the initial aluminum liquid and stirring for 5~10 minutes (min), and then the refining agent is added into the initial aluminum liquid and stirring for 5~10 min.

5. The method for preparing the aluminum carbon composite by using the foam aluminum according to claim 1, wherein in step 8, a temperature of the forming device is in a range of 200° C. to 300° C.

6. The method for preparing the aluminum carbon composite by using the foam aluminum according to claim 1, wherein in step 9, a pressure of the extrusion molding is in a range of 100 megapascals (MPa) to 150 MPa.

\* \* \* \* \*